United States Patent [19]
Chester

[11] Patent Number: 5,282,359
[45] Date of Patent: Feb. 1, 1994

[54] IMPULSE JET ENGINE

[76] Inventor: Robert G. Chester, Meadowlawn Dr. North, St. Petersburg, Fla. 33702

[21] Appl. No.: 779,421

[22] Filed: Oct. 17, 1991

[51] Int. Cl.$^5$ .......................... F02K 3/00; F02K 7/08
[52] U.S. Cl. ........................................ 60/269; 60/270.1
[58] Field of Search ................................ 60/269, 270.1

[56] References Cited

U.S. PATENT DOCUMENTS

| | | | |
|---|---|---|---|
| 1,273,466 | 7/1918 | Doble | 60/270.1 |
| 2,780,424 | 2/1957 | Price | 60/269 |
| 3,811,280 | 5/1974 | Wharton et al. | 60/270.1 |
| 4,815,942 | 3/1989 | Alperin et al. | 60/269 |

FOREIGN PATENT DOCUMENTS 554906 11/1932 Fed. Rep. of Germany ........ 60/269

*Primary Examiner*—Richard A. Bertsch
*Assistant Examiner*—Howard R. Richman
*Attorney, Agent, or Firm*—Joseph C. Mason, Jr.; Ronald E. Smith

[57] ABSTRACT

A jet engine having no moving parts includes a toroidal combustion chamber formed in a thickened cylindrical side wall of an engine housing and a toroidal exhaust port that directs exhaust gases radially inwardly and towards an outlet of the engine. The escaping exhaust gases travel at a high velocity and thus induce a secondary air flow through the engine. The entrained secondary air enters the engine inlet, cooling and slowing the exhaust gases. In a second embodiment, the trailing end of the housing is frusto-conical and the exhaust port directs the exhaust gases to converge toward one another so that entrained air also flows in a converging pattern. In a third embodiment, the housings of the first two embodiments are positioned in axial alignment with one another so that converging air entrained by the second housing augments the mass of air entrained by the first. Additional embodiments add a helical superheater coil in a fuel inlet line that is positioned in a combustion chamber to preheat the fuel; the inlet line terminates in an air passageway upstream of the combustion chamber so that the fuel/air mixture is admixed before it enters the combustion chamber. In all embodiments, the mass of the entrained, secondary air is large relative to the mass of the exhaust gases so that the secondary air flows through the engine at a relatively low velocity. These operating characteristics provide high thrust at a low rate of fuel consumption.

3 Claims, 2 Drawing Sheets

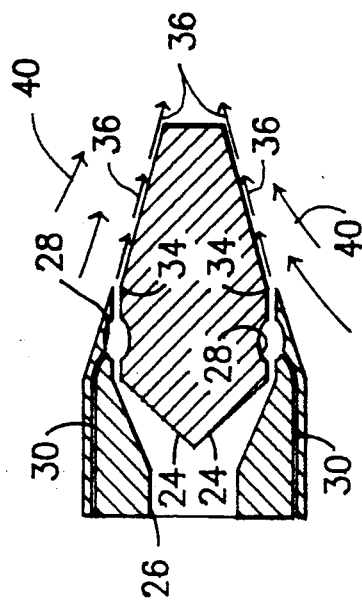
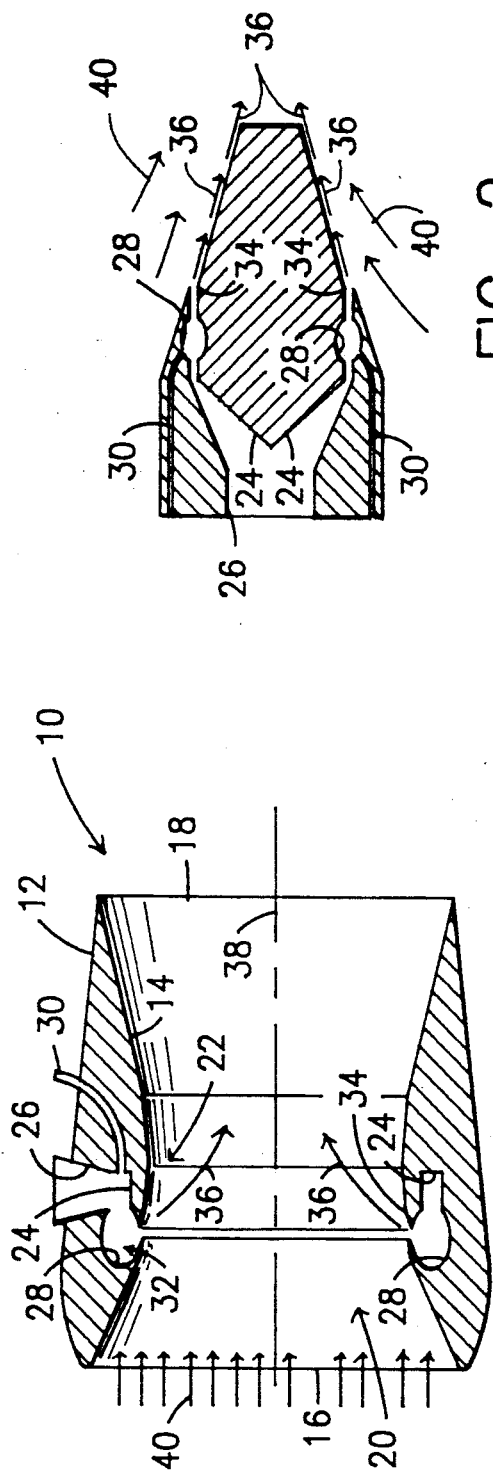
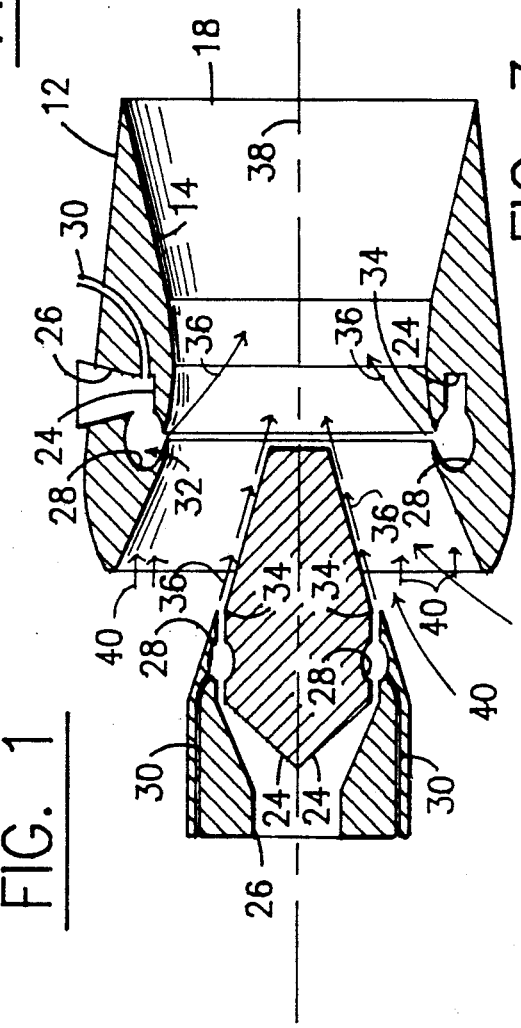

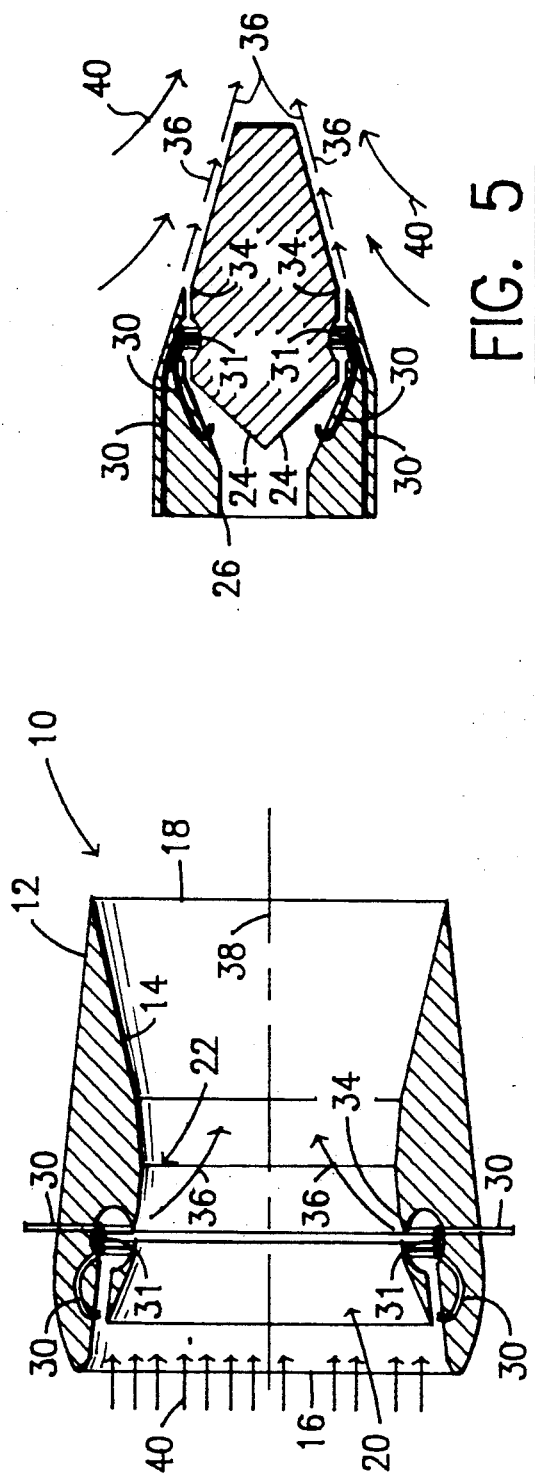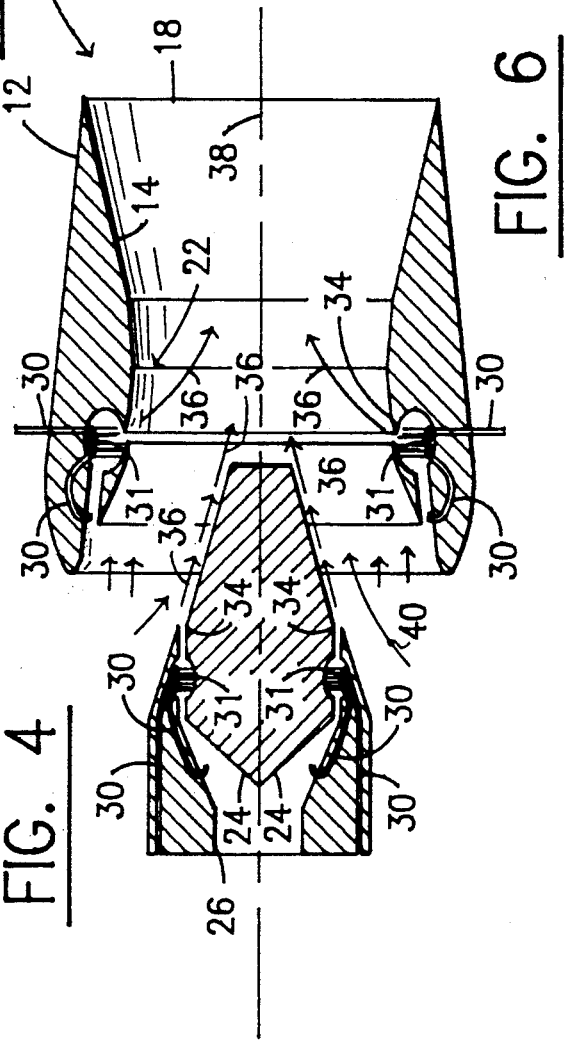

IMPULSE JET ENGINE

TECHNICAL FIELD

This invention relates, generally, to jet engines. More particularly, it relates to a low fuel consumption, high thrust engine having a relatively slow moving, relatively cool exhaust compared to the exhaust of conventional engines.

BACKGROUND ART

Jet engines of simple construction have been successfully built and operated. However, they are usually less fuel efficient than more complex engines or have some other serious shortcoming that hinders their acceptance in the marketplace.

A typical simple jet engine is disclosed in U.S. Pat. No. 3,093,962 to Gluhareff. A pre-heated gaseous fuel-air mixture is injected into an inlet passage at a velocity greater than the speed of flame propagation for that mixture so that the mixture cannot burn. The inlet passage is enlarged near the combustion zone so that the gases in the mixture slow down as they traverse the enlarged area. The speed drops to the speed of flame propagation as the mixture enters the combustion zone and, therefore, the mixture ignites as the gases flow through said zone; the expansion of gases thereby produced provides the thrust.

The fuel-air mixture of Gluhareff includes a liquefied petroleum gas such as propane; this eliminates the need for a compressor as a part of the engine. The fuel consumption rate of the Gluhareff design compares favorably with the fuel consumption rates of jet engines in common use, but such rate is still unacceptably high.

An ideal jet engine is of course unobtainable, but a consideration of the theoretical behavior of the exhaust gases of an ideal engine is instructive. If all of the energy provided by the combustion gases could be imparted to forward travel of the vehicle powered by the engine, the exhaust gases would not flow relative to the ground and would have a temperature equal to ambient. Thus, as a jet engine approaches ideal operating conditions, the flow rate of combustion gases therethrough slows and the temperature of said gases drops.

Conventional jet engines are high thrust, low efficiency devices. If the thrust or force F(t) developed by a conventional jet engine is plotted against time, a large amplitude, narrow bell curve results.

The area under the curve, found by integrating F(t) with respect to time between the interval t1 to t2, is equal to the change in momentum, or impulse of the engine. The narrowness of the bell curve, and the resulting low impulse, is a function of the limited time within which energy exchange collisions may occur. Note that substantially all of said energy exchange collisions are between the molecules of the exhaust gases, which travel at a very high speed, and the interior walls of the combustion chamber. This is the only significant source of energy exchange collisions in turbo, pulse, ram and all other types of jet engines heretofore known. Thus, the jet engines of the prior art are high in thrust but low in efficiency because the dwell time of the exhaust gas molecules in the combustion chamber is so short that secondary collisions between said molecules and ambient air are insignificant in number. Such lack of significant secondary collisions lowers the impulse of the known engines.

There is a need in the industry for a fuel efficient jet engine of simple construction that has operating characteristics that approach theoretically optimal conditions. More particularly, there is a need for a jet engine that provides more impulse than conventional engines. The instantaneous value of F(t) in such an engine would have a lower amplitude as compared to a conventional engine, but increased time would be available for energy exchange collisions to occur. Thus, the impulse would be greater. Such an improved engine would generate less thrust but would operate at a higher efficiency than conventional engines.

The teachings and suggestions of the prior art, when considered as a whole in accordance with the requirements of law, do not indicate to those of ordinary skill how the needed engine could be provided.

DISCLOSURE OF INVENTION

The longstanding but heretofore unfulfilled need for a fuel-efficient jet engine having a structural configuration of irreducible simplicity and operating characteristics that approach the ideal is now provided by an engine that entrains large quantities of ambient air to both cool and slow down the exhaust gases. The exhaust gases, when augmented by ambient air, have a mass that provides thrust at a heretofore unknown efficiency.

The engine includes a generally cylindrical housing, an inlet and an outlet; both inlet and outlet are unobstructed by compressor blades, valves, and the like as found in conventional jet engines.

The inlet and outlet are preferably circular in configuration, with the diameter of the former exceeding that of the latter. A generally cylindrical passageway, also unobstructed, is defined therebetween.

In a first embodiment, the passageway between the inlet and the outlet is constricted at a preselected location near the inlet and hence remote from the outlet, and the side walls of the housing are thickened radially outwardly of the constriction. An annular combustion chamber is formed in the thickened area of the side walls, as is an annular outlet port that permits exhaust gases to exit the combustion chamber, an annular plenum chamber where fuel and air are mixed prior to entry into the combustion chamber, and an air inlet means. The outlet port is angled to direct exhaust gases along a path of travel represented generally by a resultant vector defined by a radially inward vector and a vector coincident with the longitudinal axis of the engine, i.e., exhaust gases flow radially inwardly and toward the engine outlet.

The exhaust gases travel at a high velocity and therefore entrain ambient air into the inlet; the mass of the entrained air augments the mass of the exhaust gases and thus increases the thrust of the engine. Advantageously, the entrained air, due to its large mass, slows down the speed of and cools the exhaust gases. This increases the efficiency of the engine because, in an ideal engine, the exhaust gases would stand still, relative to the ground, and have the same temperature as ambient, as discussed above. Thus, the entrainment of air enables the operating characteristics of the novel engine to approach ideal conditions.

Thus, the Impulse Jet (Trademark) engine of this invention has two sources of energy exchange collisions, whereas all heretofore known jet engines have only one. More particularly, the impulse jet engine includes the collisions between exhaust gas molecules and combustion chamber walls common to all jet engines (the first source) and adds the exhaust gas molecules/ambient air collisions (the second source) which are insignificant in conventional engines as mentioned earlier. The second source contributes significantly more to the thrust and efficiency of the engine than said first source. Moreover, the relationship of thrust and efficiency of the second source is the reverse of the relationship existing in the heretofore known jet engines. Thus, the novel jet is called the Impulse Jet because the salient feature of its design is the generation of significant amounts of impulse compared to the high thrust, low impulse designs of the prior art.

In a second embodiment, the engine has a generally frusto-conical configuration and exhaust gases flow along the external walls thereof, entraining ambient air.

In a third embodiment, the engines of the first two embodiments are combined to form a two-stage engine.

In the first three embodiments, the fuel is delivered to a plenum chamber and is there admixed with compressed air. The velocity of the fuel-air mixture in the plenum chamber exceeds the flame propagation rate, and the mixture does not slow down to said propagation rate until it reaches the combustion chamber.

The final three embodiments are created by modifying each of the first three. Ambient air is introduced into the combustion chamber of each embodiment through an air passageway that provides fluid communication between the inlet of the engine and said combustion chamber. This direct feeding of ambient air into the combustion chamber eliminates the plenum chamber. The fuel line includes superheater coils that encircle or circumscribe the annular combustion chamber so that the fuel is pre-heated; the pre-heated fuel is injected into the combustion chamber, and burns more thoroughly than relatively cool fuel. More particularly, it is injected into the air passageway that feeds ambient air into the combustion chamber; this heats that air and further enhances the thoroughness of the combustion that occurs in the combustion chamber.

A liquefied petroleum gas such as propane is the preferred fuel in all embodiments, but any combustible fuel may be effectively burned by the novel engine. As in the Gluhareff engine, the use of propane or other liquefied gaseous fluid obviates the need to further compress the fuel.

In all embodiments, the bell curve that depicts the thrust generated by the engine over time has a lower amplitude but elongated duration in time vis a vis the bell curve that depicts the operation of a conventional engine.

The force developed in this example is half that of a conventional jet engine. The impulse (the area under the curve), however, is significantly greater than in the conventional jet engine because the time interval is longer, i.e., there is more time for energy exchange collisions to occur.

The primary object of this invention is to pioneer the art of high efficiency jet engines.

Another important object is to pioneer the art of high efficiency jet engines having no moving parts.

A more specific object is to provide a jet engine having relatively cool, relatively low velocity exhaust gases so that more impulse is imparted to the engine compared to engines having hot, high velocity exhaust gases.

Still another object is to provide a jet engine that generates lower thrust than a conventional engine, at a higher efficiency, by exhibiting operation characteristics that include the provision of more impulse than conventional engines.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a more full understanding of the nature and objects of the invention, reference should be made to the following detailed description, taken in connection with the accompanying drawings, in which:

FIG. 1 is a longitudinal sectional view of a first illustrative embodiment of the novel engine;

FIG. 2 is a diagrammatic, side elevational view of a second embodiment of the engine;

FIG. 3 is a compound vi®w of a novel engine produced by combining the engines of FIGS. 1 and 2;

FIG. 4 is a longitudinal sectional view of a fourth embodiment, said fourth embodiment being similar to the first;

FIG. 5 is a diagrammatic, side elevational view of a fifth embodiment of the engine, said fifth embodiment being similar to the second; and FIG. 6 is a compound view of a novel engine produced by combining the engines of FIGS. 4 and 5.

Similar reference numerals refer to similar parts throughout the several views of the drawings.

BEST MODES FOR CARRYING OUT THE INVENTION

Referring now to FIG. 1, it will there be seen that a first exemplary embodiment of the novel engine is denoted as a whole by the reference numeral 10.

Engine 10 includes a generally cylindrical housing 12 having generally cylindrical interior side walls 14. Inlet 16 has a circular configuration, or any other operative predetermined configuration, when seen in end view, as does outlet 18; as indicated in FIG. 1, the diameter of inlet 16 exceeds that of outlet 18. Note also that the thickness of the side walls of the housing 12 is at its thinnest at the inlet and outlet of the housing.

Unobstructed passageway 20 is constricted as at 22, and housing 12 is thickened radially outwardly of said constriction as shown. Plenum chamber 24 is positioned between the outlet of air inlet 26 and the inlet of combustion chamber 28; note that chambers 24 and 28 are annular in configuration and that both chambers are coaxial with the engine. Fuel is delivered to the plenum chamber 24 through fuel line 30 and compressed air is delivered to air inlet 26 by a suitable air line, not shown. It is believed that an air pressure of several hundred pounds per square inch would be sufficient to enable economical operation of the engine.

Accordingly, fuel and air mix in the plenum chamber and the fuel/air mixture then enters the combustion chamber where suitable means are employed to ignite it; the flow rate is controlled such that the combustion occurs in the forward part 32 thereof. The combustion products exit chamber 28 through annular exhaust port 34; that port is configured as shown to direct the exhaust gases generally in the direction indicated by the single-headed directional arrows 36, i.e., the gases flow generally radially inwardly toward the longitudinal axis 38 of the engine and toward outlet 18 thereof. In other words, the gas particles converge toward one another as they flow rearwardly. A single particle follows a general path of travel along a resultant vector that represents the sum of a radially inwardly directed vector and a vector coincident with the longitudinal axis of the engine. The actual path of travel, due to turbulence, includes many deviations from the resultant vector.

It should be appreciated that the flow of gases represented by arrows 36 is a high velocity flow; as such, the flow will induce a secondary airflow in its wake. More particularly, the high velocity airflow will entrain ambient air as indicated by the plural small arrows at the inlet of the engine that are collectively denoted 40. The ratio of the mass of ambient air entrained into passageway 20 by combustion gases 36 to the mass of said combustion gases is large; thus, the combustion gases are cooled and their velocity is lowered. Due to the relatively large mass of the entrained air 40, the velocity of said entrained air through passageway 20 will also be low. Thus, the engine's operating conditions will approach the above-mentioned ideal operating conditions as the ratio of mass of entrained air to the mass of combustion gases increases.

A second embodiment of the novel engine is depicted in FIG. 2; the novel housing of this engine has a generally cylindrical leading end and a frusto-conical trailing end. Combustion air enters the engine through inlet 26, and flows through plenum chamber 24 to annular combustion chamber 28. As depicted, the inlet and plenum chamber are formed in the cylindrical leading end of the housing, whereas the combustion chamber 28 is formed in the trailing end of said housing. Note that plenum chamber 24 has an annular sweep; it provides fluid communication between air inlet 26 and the annular combustion chamber 28.

Fuel enters combustion chamber 28 through fuel lines 30 and the fuel/air mixture is ignited in said chamber by suitable means. Annular exhaust port 34 has an inlet in fluid communication with combustion chamber 28 and an outlet in fluid communication with ambient air external to the housing of this embodiment. The exhaust port is specifically positioned at a predetermined angular disposition so that the exhaust gases 36 flow from said exhaust port 34 and hug or flow along the frusto-conical outer side walls of the engine as shown due to the orientation of the port 34, i.e., said gases converge toward one another. Note that the exhaust port is positioned near the leading end of the trailing end of the housing so that the converging exhaust gases flow along almost the entire extent of the trailing end.

Primary, high velocity flow 36 entrains secondary, ambient air 40 and the benefits derived therefrom are as in the first-described embodiment. Note that the secondary air flow is also convergent.

The embodiments of FIGS. 1 and 2 are shown positioned in axial alignment with one another to produce a third embodiment in FIG. 3. As shown, the outlet or trailing end of the FIG. 2 housing is concentrically received within the inlet or leading end of the FIG. 1 housing. Preferably, the trailing end of the FIG. 2 housing is positioned on the leading side of the combustion chamber of the FIG. 1 housing, as shown.

Advantageously, the converging secondary air flow entrained by the second housing is easily received within the inlet of the first housing, i.e., the tapered shape of the trailing end of the second housing acts as a focusing means.

While this arrangement consumes more fuel than either of the first two embodiments alone, at least when both units are operating, further studies may show that an improvement in efficiency may be achieved by the cascading of said units. The laws of fluid mechanics will dictate the optimal relative positioning of the two stages of the FIG. 3 embodiment. Simple mechanical telescoping means could be employed to change the relative positions of the two engines with respect to one another to provide extra power for take-off, for example. Moreover, it may be desirable to shut down one of the stages when maximum cruising altitude has been attained, or to otherwise independently throttle the engines as conditions require.

The fourth through sixth embodiments are depicted in FIGS. 4-6, respectively. It will there be seen that the fuel line 30 of the first three embodiments is modified in the final three embodiments. More particularly, fuel line 30 has a helical coil 31 formed therein. Coil 31 overlies the radially outermost wall of the combustion chamber, and the fuel line encircles said chamber a plurality of times to form the coil as shown. Coil 31 could also overlie the radially innermost wall of the chamber, could be positioned between the outermost and innermost walls, or could even be positioned external to the chamber. Accordingly, fuel in fuel line 30 is constrained to circle the combustion chamber a number of times prior to entry thereinto; this preheats the fuel and increases the efficiency of the engine. Preheating coils are known in the industry as superheating coils. The diameter of the coil is of course substantially equal to the diameter of the combustion chamber it circumscribes.

Annular air passageway 27 is provided in the embodiment of FIG. 4; this passageway is substantially parallel to passageway 20 and provides fluid communication between ambient air 40 and the combustion chamber 28.

The superheated fuel is injected into air passageway 27 as at 29, i.e., upstream of the combustion chamber. Thus, the fuel flowing out of the fuel inlet line 30 is thoroughly admixed with ambient air in the turbulence of the passageway 27, thereby eliminating the need for plenum chamber 24 of the first embodiment. The preheated fuel also serves to preheat the air entering the combustion chamber, thereby further enhancing the performance of the engine.

Superheater coil 31 is also added to the embodiment of FIG. 5. Plenum chamber 24 is not eliminated in this embodiment, because said plenum chamber 24 serves the same function as the air passageway 27 of the fourth embodiment, i.e., it delivers ambient air to combustion chamber 28.

As in the fourth embodiment, the superheated fuel is injected, as it exits fuel line 30, at point 29 in air passageway or plenum 24. The turbulence thoroughly admixes the fuel and air, and heats the latter.

The final embodiment is shown in FIG. 6 and is the combination of the fourth and fifth embodiments. Its general functioning is the same as the third embodiment.

In all embodiments, the force and impulse contributed by the burning of fuel in the combustion chamber is almost negligible when compared to the force and impulse resulting from the interaction of the jet exhaust with ambient air.

Clearly, the impulse and hence the efficiency of the invention easily surpasses that of conventional jet engines.

The elegant design of these engines represents a significant advance in the art of jet engines and related arts.

This invention is clearly new and useful. Moreover, it was not obvious to those of ordinary skill in this art at the time it was made, in view of the prior art considered as a whole as required by law.

This invention pioneers the art of entrained or secondary air flow jet engines and related devices. Accordingly, the claims that follow are entitled to broad interpretation, as a matter of law, to protect from piracy the heart or essence of this breakthrough invention.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A jet engine, comprising:
   a generally cylindrical housing having an inlet and an outlet;
   said housing having a generally cylindrical outer sidewall and a generally cylindrical inner sidewall;
   an airflow passageway that extends from said housing inlet to said housing outlet, said airflow passageway being unobstructed along its length;
   a single constriction formed in said airflow passageway between said housing inlet and said housing outlet, said constriction being greatest at a predetermined location closer to said housing inlet than said housing outlet, and said single constriction being formed by a gradual increase in the distance between said inner and outer sidewalls from said housing inlet toward said predetermined location and a gradual decrease in said distance from said predetermined location toward said housing outlet;
   an annular combustion chamber formed between said inner and outer sidewalls substantially where the distance between said inner and outer sidewalls is greatest;
   an annular exhaust port also formed between said inner and outer sidewalls adjacent to said combustion chamber and in fluid communication with said combustion chamber;
   said annular exhaust port oriented to discharge exhaust gases toward said housing outlet to impart thrust to said engine;
   means for introducing a fuel/air mixture into said combustion chamber and for igniting said mixture;
   said combustion chamber being positioned at a preselected location along the extent of said housing that is closer to said inlet than said outlet to thereby enhance the entrainment of air into said inlet and hence to enhance cooling of the exhaust gases and to slow the rate of flow of said exhaust gases through the engine;
   said housing having generally cylindrical side walls that are thicker where said combustion chamber and said exhaust port are formed therein relative to the thickness thereof at said inlet and outlet;
   a combustion air inlet means formed in said housing, said combustion air inlet means providing fluid communication between a source of combustion air external to said engine and said combustion chamber;
   a fuel inlet means formed in said housing, said fuel inlet means providing fluid communication between a source of fuel external to said engine and said combustion chamber; and
   a plenum chamber formed between said side walls, said plenum chamber having a first inlet in fluid communication with said combustion air inlet means, a second inlet in fluid communication with said fuel inlet means, and an outlet in fluid communication with said combustion chamber so that fuel and combustion air are admixed in said plenum chamber prior to combustion thereof in said combustion chamber;
   whereby greater quantities of ambient air are entrained into said engine through said housing let, relative to the quantities of ambient air entrained by a conventional engine having an obstructed airflow passageway, said greater quantities of air enhancing the thrust produced by said engine.

2. The engine of claim 1, wherein said housing inlet and housing outlet have a circular configuration and wherein a predetermined diameter of said housing inlet is greater than a predetermined diameter of said housing outlet.

3. A jet engine, comprising:
   a housing having generally cylindrical inner and outer side walls;
   said housing having an inlet and an outlet;
   an annular combustion chamber formed in said housing between said inner and outer side walls;
   an annular exhaust port in fluid communication with said combustion chamber, said annular exhaust port being formed in said housing between said inner and outer side walls;
   said exhaust port oriented to discharge exhaust gases toward said housing outlet to impart thrust to said engine;
   means for introducing a fuel/air mixture into said combustion chamber and for igniting said mixture;
   said combustion chamber being positioned at a preselected location along the extent of said housing that is closer to said inlet than said outlet to thereby enhance the entrainment of air into said inlet;
   said generally cylindrical side walls being spaced further apart from one another where said combustion chamber and exhaust port are formed therebetween relative to the spacing therebetween at said inlet and outlet;
   a combustion air inlet means formed in said housing, said combustion air inlet means providing fluid communication between a source of combustion air external to said engine and said combustion chamber;
   a fuel inlet means formed in said housing, said fuel inlet means providing communication between a source of fuel external to said engine and said combustion chamber; and
   a plenum chamber formed in said housing, said plenum chamber having a first inlet in fluid communication with said combustion air inlet means, a second inlet in fluid communication with said fuel inlet means, and an outlet in fluid communication with said combustion chamber so that fuel and combustion air are admixed in said plenum chamber prior to combustion thereof in said combustion chamber.

* * * * *